United States Patent [19]

Helmig et al.

[11] Patent Number: 4,790,071
[45] Date of Patent: Dec. 13, 1988

[54] LINE TRIMMER WITH REPLACEABLE CUTTING BLADE ASSEMBLY

[75] Inventors: Michael A. Helmig, Springtown, Tex.; John F. Gander, Cape Town, South Africa

[73] Assignee: Trimrite, Inc., Weatherford, Tex.

[21] Appl. No.: 81

[22] Filed: Jan. 2, 1987

[51] Int. Cl.⁴ .............................................. B26B 7/00
[52] U.S. Cl. ................................. 30/276; 30/279 A; 30/347; 56/12.7
[58] Field of Search .................. 83/13; 30/276, 279, 30/347; 56/12.7, 249.5

[56] References Cited

U.S. PATENT DOCUMENTS

| | | | |
|---|---|---|---|
| 1,868,918 | 7/1932 | Schenk | 30/347 |
| 2,953,852 | 9/1960 | Dehn | 30/276 |
| 4,270,271 | 6/1981 | Feldman et al. | 30/276 |
| 4,276,691 | 7/1981 | Palmieri et al. | 30/347 |
| 4,281,505 | 8/1981 | Fuelling, Jr. et al. | 30/276 |
| 4,656,739 | 4/1987 | Pittinger, Jr. | 56/12.7 |

FOREIGN PATENT DOCUMENTS 2118811A 11/1983 United Kingdom ............... 30/276

Primary Examiner—E. R. Kazenske
Assistant Examiner—Scott A. Smith
Attorney, Agent, or Firm—James E. Bradley

[57] ABSTRACT

A flexible line trimmer for cutting vegetation can be converted to a blade cutting device. The trimmer has a motor driven rotatable head with a cavity defined by a wall of the head. The cavity receives a spool wrapped with line. The line has a free end extending through an aperture in the wall of the head. Drive lugs located in the cavity couple the spool to the drive head for rotation. The blade carrier replaces the spool and line. The blade carrier has a central portion that locates within the cavity while the spool is removed. The central portion has at least one drive member that is positioned to engage the drive lugs to rotate the blade carrier with the head. A plurality of blades are mounted to the periphery of the carrier. The carrier is fastened to the head.

6 Claims, 3 Drawing Sheets

LINE TRIMMER WITH REPLACEABLE CUTTING BLADE ASSEMBLY

BACKGROUND OF THE INVENTION

1. Field of the Invention:

This invention relates in general to flexible line trimmers for cutting vegetation, and in particular to a cutting blade assembly for use with such a trimmer.

2. Description of the Prior Art:

A conventional flexible line trimmer has a motor that rotates a shaft. The drive head is attached to the shaft for rotation. The drive head has a cavity within which a spool is located. The spool is wound with a flexible monofiliment line. The ends of the line extend through holes provided in the wall of the head. These trimmers are used to cut around trees, walks and fences.

For cutting heavier vegetation, such as weeds, a blade is preferrable. One type of blade cutter has a carrier to which a plurality of plastic blades are pivotally secured. This blade carrier may be attached to the shaft of a line trimmer by removing the entire head of the line trimmer and securing it.

While the prior art blade carriers work well enough, removing the entire drive head and replacing it with the blade carrier can be time consuming and require tools. Also, adapters and spacers are often required.

SUMMARY OF THE INVENTION

The blade carrier of this invention is adapted to be used with a line trimmer that has drive lugs located in the cavity of the drive head. These drive lugs normally are used to connect and disconnect the spool with the drive head to advance line when the device is tapped on the ground. The drive lugs are spaced vertically apart from each other and are staggered rotationally to accomplish the advancement of an increment of line when the spool moves up and down in the drive head.

The blade carrier is used with this drive head while the spool is removed. The blade carrier has a central portion that locates within the cavity while the spool is removed. The central portion has drive members which engage the drive lugs in the drive head to cause the carrier to rotate with the head. The carrier has a plurality of blades mounted to the periphery. Fastener means fastens the carrier to the head.

DESCRIPTION OF THE PREFERRED EMBODIMENT

Figure 1:
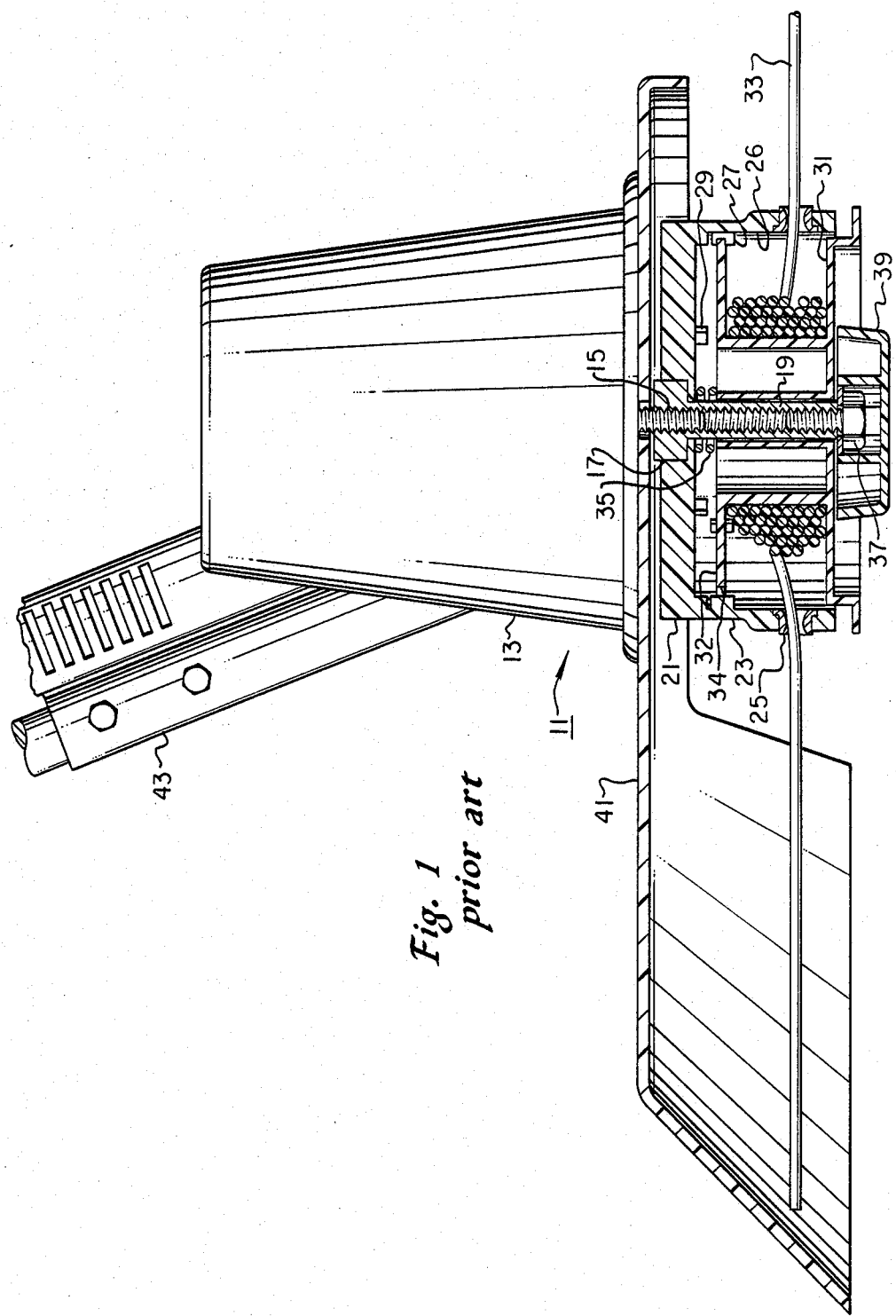
FIG. 1 is a partial vertical sectional view of a prior art line trimmer.

Referring to FIG. 1, line trimmer 11 has a housing 13 that contains an electrical motor (not shown). The motor rotates a threaded shaft 15 that extends downward. A drive member 17 is secured to the threaded shaft 15. The drive member 17 has a tubular lower end 19 with internal threads contained in it. The drive member 17 is polygonal and is integrally joined to a drive head 21. Head 21 is a cylindrical, cupped-shaped member, having a closed top and an open bottom. Head 21 has a depending wall 23 that is cylindrical. Two apertures 25 are located in the wall 23 on opposite sides from each other.

The head 21 has a cavity 26 that is defined by its closed top and wall 23. A plurality of lower drive lugs 27 are located in the cavity 26. The lower drive lugs 27 are formed integrally with the head 21 and located on the inside surface of the wall 23. The lower drive lugs 27 are spaced in a circular array. There also are a plurality of upper drive lugs 29 in the cavity 26, located above the lower drive lugs 27. The upper drive lugs 29 are formed integrally with the head 21 and are located on the inside surface of the wall 23 at the top. The upper drive lugs 29 are also formed in a circular array around the drive member 17. The upper drive lugs 29 are staggered rotationally from the lower drive lugs 27.

A spool 31 is adapted to locate in the cavity 26. Spool 31 is wrapped with line 33 which has two free ends. Each end extends out of one of the apertures 25. Spool 31 has an upper flange 32 with spaced apart recesses 34 formed on its edge, defining teeth. Each recess 34 receives one of the lower drive lugs 27 to cause the spool 31 to rotate with the head 21 when the spool 31 is in the lower portion shown. In the upper position, the recesses 34 receive the upper drive lugs 29.

When the spool 31 is pushed upwardly, the flange 32 disengages from the lower drive lugs 27, allowing the spool 31 to slip rotationally relative to the drive head 21 to feed out additional line until the upper drive lugs 29 engage the recesses 34. Once disengaged from the lower lugs 27, the recesses 34 will be aligned with the upper lugs 29, but the spool 31 will slip until the edges of the recesses 34 are contacted by the upper lugs 29. A coil spring 35 encircles the tubular end 19 of the drive member 17 and pushes down on the spool 31 to cause it to move from the upper position back to the drive position in engagement with the lower drive lugs 27.

Spool 31 is held in the cavity by a bolt 37. Bolt 37 is screwed into the tubular end 19 of the drive member 17. A cap 39 is carried by the bolt 37 through a polygonal cavity located in the cap 39. The cap 39 is free to move axially on the bolt 37, but rotating the cap 39 relative to the tubular end 19 will cause the bolt 37 to rotate. When the cap 39 is tapped on the ground, it pushes the spool 31 upward while the bolt 37 remains in place.

A skirt 41 extends outward from the housing 13 to form a shield around the cutting line 33. A handle 43 extends upward from the housing 13.

Figure 2:
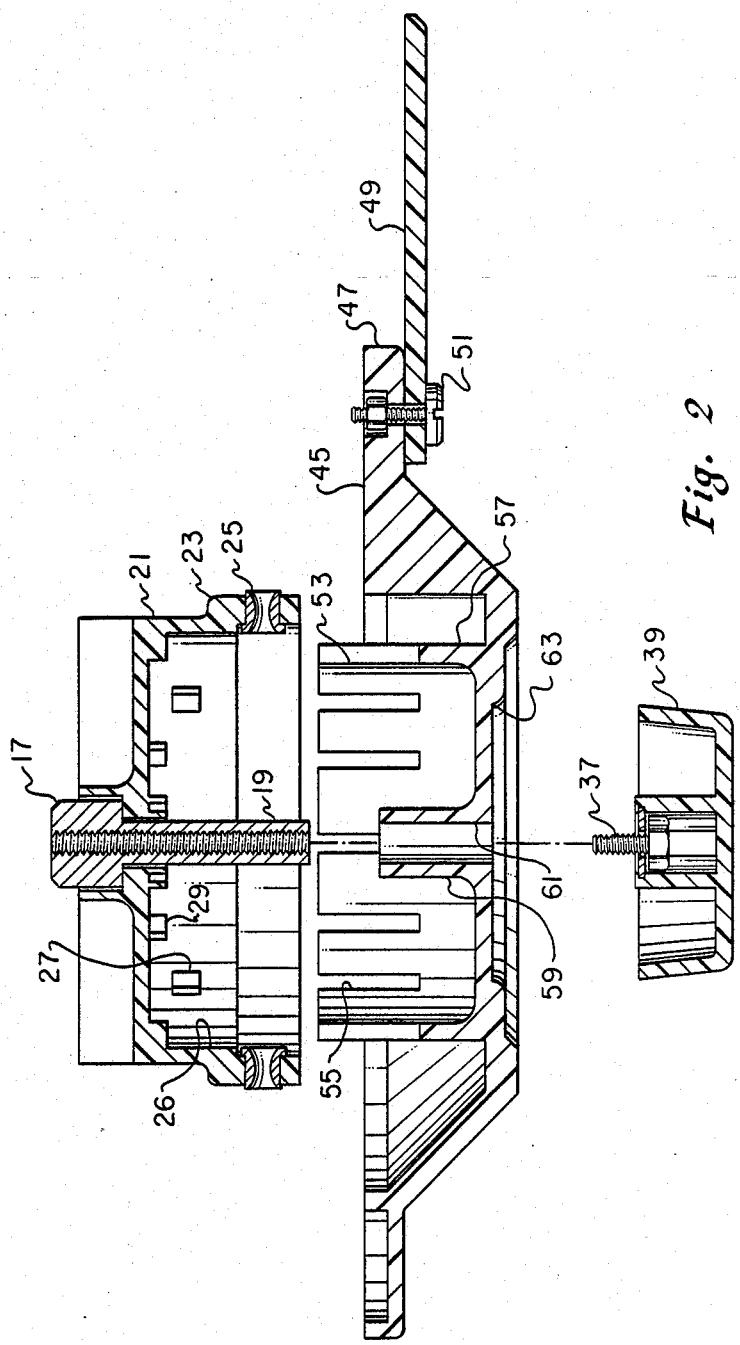
FIG. 2 is an exploded sectional view of a blade carrier for use with the line trimmer of FIG. 1.
Figure 3:
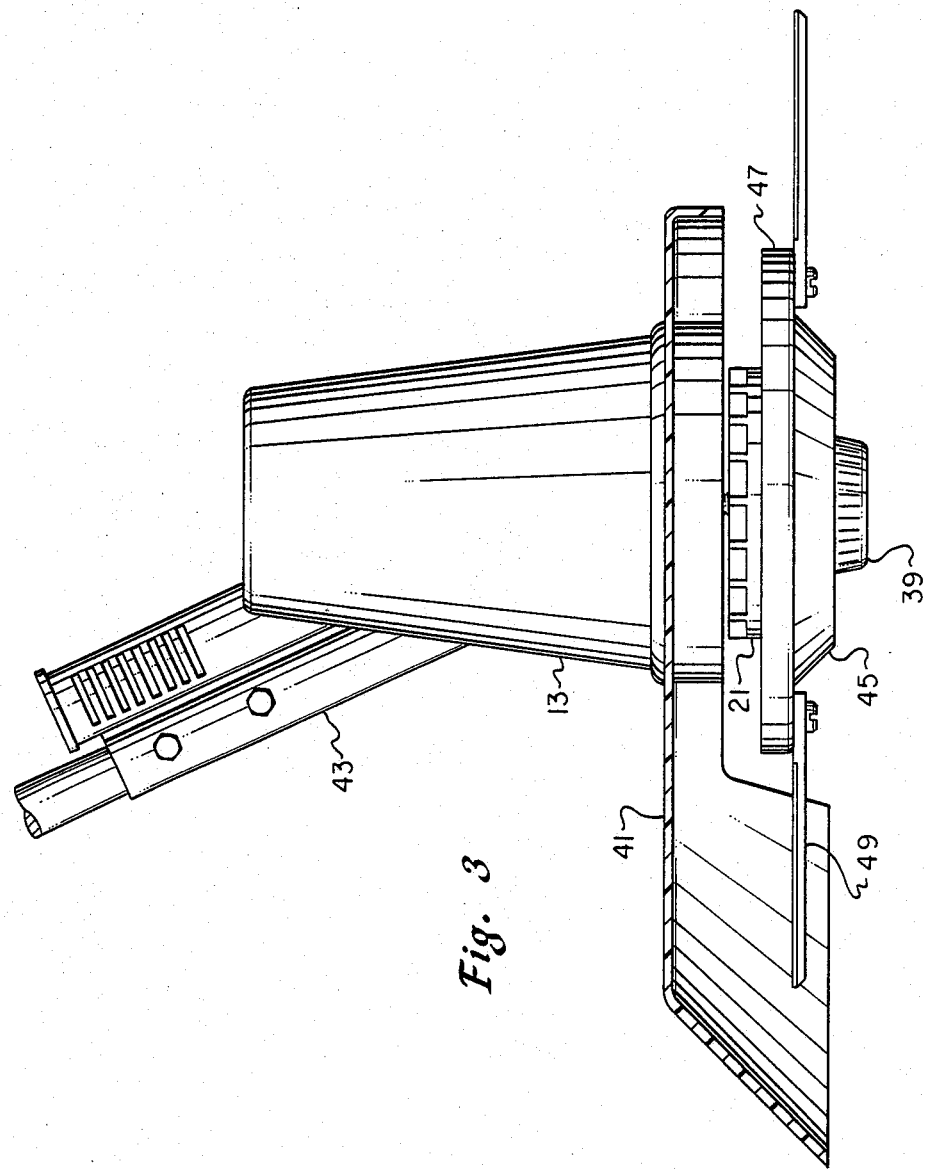
FIG. 3 is a side view, partially sectioned, of a line trimmer having a blade carrier as shown in FIG. 2 installed.

Referring to FIG. 2, the prior art trimmer 11 shown in FIG. 1 may also be used to hold a blade carrier 45. The spool 31 and line 33 are removed when the blade carrier 45 is attached to the head 21. The blade carrier 45 has a rim 47 at its periphery. Three blades 49 (one shown in FIG. 2 and two shown in FIG. 3), are attached to the rim 47. Each blade 49 is a thin, flat, and relatively hard plastic member, such as shown in U.S. Pat. No. Des. 280903, Oct. 8, 1985, Lawrence E. Barbula. Each blade 49 is pivotally attached to the rim 47 by a screw 51. The blades 49 are free to pivot around the screw 51 to reduce damage in case they strike a hard object.

The blade carrier 45 has a central portion 53 that is cylindrical. Central portion 53 has an outer diameter that is only slightly less than the inner diameter of the wall 23 of head 21. Central portion 53 extends upward from the blade carrier 45 a short distance for insertion into the cavity 26.

The central portion 53 has an open top and a plurality of slots 55 formed in it. The slots 55 extend downward from the upper edge of the central portion 53. Each slot 55 is positioned to align with one of the drive lugs 27 and 29. Each slot 55 is of slightly greater width than the drive lug 27, 29. When the central portion 53 is inserted fully into the cavity 26, each slot 55 engages one of the drive lugs 27, 29 to cause the blade carrier 45 to rotate with the head 21. The wall portions of the central portion 53 located between each slot 55 thus become drive members for engaging the drive lugs 27, 29.

The blade carrier 45 has an annular recess 57 that extends around the central portion 53. The recess 57 has a radial width that is sized to closely receive the wall 23 of head 21. The distance from the upper edge of the central portion 53 to the bottom of the recess 57 is slightly greater than the height of the wall 23. The bottom of the recess 57 is located below the level of the blades 49, and the blades 49 are located below the upper edge of the central portion 53.

The bottom of the central portion 53 is closed and has an integrally formed hub 59 located on its axis. Hub 59 has a hole 61 through it for receiving the tubular end 19, which serves as part of the drive shaft 15. A recess 63 is located on the bottom of the central portion 53 for receiving the cap 39.

In operation, to convert the prior art trimmer shown in FIG. 1 to blade usage, the cap 39 is rotated to unscrew the bolt 37. The spool 31 and the line 33 are removed and optionally the spring 35. The spring 35 can remain in place in cavity 26, and if so, the hub 59 will slide within the interior of the spring 35. Then the blade carrier 45 is attached to the head 21. This is accomplished by inserting the central portion 53 into the cavity 26. The blade carrier 45 is rotated until each slot 55 aligns with one of the drive lugs 27, 29. The central portion 53 is inserted fully into the head 21 into abutment with the top of the head 21. Then the bolt 37 is screwed into the tubular end 19 by rotating the cap 39. The assembly will then appear in FIG. 3. The motor rotates the shaft 15 in operation, causing the carrier 45 to rotate and the blades 49 to cut vegetation. Unlike the flexible line operation, tapping the carrier 45 on the ground will have no effect. The carrier 45 always remains in rotational engagement with the head 21.

The invention has significant advantages. The trimmer can be used with either flexible line or with blades. The conversion is quick because the head for the line trimmer is also used to hold the blade carrier. No modification to the line trimmer is needed. No tools are required to convert from line to blade usage.

While the invention has been shown in only one of its forms, it should be apparent to those skilled in the art that it is not so limited, but is susceptible to various changes without departing from the scope of the invention.

We claim:

1. An apparatus for cutting vegetation, comprising in combination:
   a motor driven shaft;
   a head mounted to the shaft for rotation therewith, the head having a depending wall defining a cavity;
   a plurality of lower drive lugs located in the cavity for rotation with the head, spaced in a circular array surrounding the shaft below and rotationally staggered from the upper drive lugs;
   at least one aperture located in the wall of the head;
   a spool adapted to be removably stored in the cavity, and being wrapped with a flexible line which has a free end adapted to extend through the aperture in the head, the spool being movable between upper and lower positions in engagement with the upper and lower drive lugs, respectively, for coupling the spool with the head for rotation and for feeding out additional line when moving between said upper and lower positions;
   a blade carrier having an upward protruding cylindrical central wall portion and a peripheral rim, the central wall portion adapted to be located in the cavity while the spool is removed, the central wall portion having at least one drive member positioned to engage at least one of the drive lugs to cause the carrier to rotate with the head;
   a plurality of blades pivotally secured to the rim of the carrier for cutting vegetation; and
   fastener means for fastening the carrier to the shaft.

2. The apparatus according to claim 8 wherein the central wall portion contains at least one slot extending parallel with the axis of the central wall portion to define the drive member.

3. An apparatus for cutting vegetation, comprising in combination:
   a motor driven shaft;
   a head mounted to the shaft for rotation therewith, the head having a depending wall defining a cavity;
   a plurality of upper drive lugs located in the cavity for rotation with the head, and spaced in a circular array surrounding the shaft;
   a plurality of lower drive lugs located in the cavity for rotation with the head, spaced in a circular array surrounding the shaft below and rotationally staggered from the upper drive lugs;
   at least one aperture located in the wall of the head;
   a spool adapted to be removably stored in the cavity, and being wrapped with a flexible line which has a free end adapted to extend through the aperture in the head, the spool being movable between upper and lower positions in engagement with the upper and lower drive lugs, respectively, for coupling the spool with the head for rotation and for feeding out additional line when moving between said upper and lower positions;
   a blade carrier having a central cylindrical portion and a peripheral rim, the central portion adapted to be located in the cavity while the spool is removed, the central portion having a plurality of slots which receive at least some of the drive lugs to cause the carrier to rotate with the head;
   a plurality of blades pivotally secured to the rim of the carrier for cutting vegetation; and
   fastener means for fastening the carrier to the shaft.

4. The apparatus according to claim 3 wherein the drive lugs are formed on the inside of the wall of the head, and the central portion of the blade carrier is closely received within the wall of the head.

5. The apparatus according to claim 3 wherein the carrier has an annular recess surrounding the central portion, which is adapted to receive the wall of the head.

6. An apparatus for cutting vegetation, comprising in combination:
   a motor driven shaft;
   a head mounted to the shaft for rotation therewith, the head having a depending wall defining a cavity;

a plurality of upper drive lugs located in the cavity for rotation with the head, and spaced in a circular array surrounding the shaft;

a plurality of lower drive lugs located in the cavity for rotation with the head, spaced in a circular array surrounding the shaft below and rotationally staggered from the upper drive lugs;

at least one aperture located in the wall of the head;

a spool adapted to be removably stored in the cavity, and being wrapped with a flexible line which has a free end adapted to extend through the aperture in the head, the spool being movable between upper and lower positions in engagement with the upper and lower drive lugs, respectively, for coupling the spool with the head for rotation and for feeding out additional line when moving between said upper and lower portions;

a blade carrier having a central cylindrical portion and peripheral rim, the central portion adapted to be located in the cavity while the spool is removed, the central portion having a plurality of slots which receive the lower drive lugs to cause the carrier to rotate with the head;

the carrier having an annular recess on its upper side surrounding the central portion for receiving the wall of the head;

a plurality of blades pivotally secured to the rim of the carrier for cutting vegetation; and fastener means for fastening the carrier to the shaft.

* * * * *